Feb. 28, 1967 W. F. BARTLETT 3,307,150

QUEUE STORE

Filed Nov. 16, 1962 2 Sheets-Sheet 1

INVENTOR.
WILLIAM F. BARTLETT
BY
George W. Killian
AGENT

Feb. 28, 1967 W. F. BARTLETT 3,307,150

QUEUE STORE

Filed Nov. 16, 1962 2 Sheets-Sheet 2

United States Patent Office 3,307,150
Patented Feb. 28, 1967

3,307,150

QUEUE STORE

William F. Bartlett, Rochester, N.Y., assignor, by mesne assignments, to Stromberg-Carlson Corporation, Rochester, N.Y., a corporation of Delaware Filed Nov. 16, 1962, Ser. No. 238,083
16 Claims. (Cl. 340—172.5)

This invention relates in general to register means in time division multiplex systems and, more particularly, to register means for queuing calls in a time division multiplex telephone system.

Although the invention herein disclosed is suitable for the queuing of various types of signals, or information, it is particularly adapted for use in queuing calls awaiting operator assistance in a time division multiplex telephone system.

It is the general object of this invention to provide a new and improved queue store.

It is a more particular object of this invention to provide a new and improved queue store wherein means are provided for each element in the queue to maintain its position relative to all other elements in the queue.

It is another object of this invention to provide a new and improved queue store wherein each element in the queue is extracted from the queue store in the same sequence in which they were entered into the queue store.

It is another object of this invention to provide a new and improved queue store which will provide an indication when the queue is full and which will inhibit an entry into the queue store when it is full.

In a dial telephone system, occasions will arise wherein a subscriber requires the assistance of an operator to complete a connection, to provide information, or for some other service. On occasion, when an operator's assistance is sought, the operator will be busy providing assistance to other subscribers and, therefore, unable to provide immediate assistance to the subscriber originating the connection. In such circumstances, it is conventional to permit the subscriber seeking the assistance of the operator to wait until such time as the operator can devote personal attention to the call. While the calling subscriber is waiting, he may be given ringback tone or a recorded message may be provided to explain the delay. In any event, if the subscriber waits, the operator will eventually answer the call and provide the required service.

Occasionally, situations will arise wherein there is an insufficient number of operators, or a surge of calls requiring operator assistance, with the result that several calls may be simultaneously waiting for the operator's assistance. Under these conditions, the calling subscribers must either abandon their attempt to reach the operator or wait the necessary length of time until an operator becomes free to answer the individual calls and provide the desired assistance. When a plurality of subscribers are waiting for an operator and no special equipment is provided, the operator will not know the sequence in which the plurality of waiting subscribers originated their calls and, therefore, it will not be possible for the operator to serve the subscribers in the same sequence in which they originated the requests for assistance. Accordingly, it is not possible for the operator to treat all subscribers equally and fairly in answering the waiting calls. That is, inadvertently some subscribers are bound to be kept waiting while other subscribers who originated their calls later are answered first.

Prior art systems have been proposed to minimize the difficulties outlined above. For example, gating systems have been employed in electromechanical switching systems which gate groups of calls to the operators and a new group of calls are not gated in until all subscribers in the previous group have received the desired service. This type of system provides reasonably equal service to all subscribers. However, it does not offer any assurance that the longest waiting subscriber in each group is always given service first. However, up to the present time, such systems provided the most economical compromise between a costly system for handling calls in the exact order of receipt and no system with the resulting random answering. Patent No. 2,923,777, issued to G. O. K. Schneider on February 2, 1960, discloses one type of queue store for use in electronic telephone switching systems.

In accordance with the present invention, there is provided a queue store comprising a plurality of delay line registers. An input distributor routes signals indicative of each line making a call into a predetermined group of the plurality of registers in the sequence that the calls are originated. In the event that the queue store registers are filled to their capacity, a busy tone is returned to any subscriber seeking entry into the queue store. The delay line registers are divided into a plurality of unique groups and the input distributor routes the waiting signal to successive ones of the groups in a predetermined sequence on an endless belt principle. An output distributor extracts the signals from the groups of registers in the same predetermined sequence, thereby assuring that the waiting calls are removed from the queue store in the same sequence in which they were entered. A comparator circuit is provided which constantly monitors the input and output distributors and which allows an input into the queue store only when there is an empty group of the delay line registers available.

It should be particularly noted that no specific group of the delay line registers within the queue store is considered to have top priority; rather, each group in its turn has top priority. That is, the waiting signals are not shifted from group to group until they finally reach the top priority group, but, rather, the signals remain in the same group wherein they are originally entered and the signals are sequentially extracted from their respective groups of registers.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings wherein FIGS. 1 and 2 should be arranged in successive order from left to right to show a logic diagram of a system incorporating the invention.

It is to be understood that only the details of the system necessary for an understanding of the invention have been shown. For example, standard logic symbols are used to indicate components such as AND gates, OR gates, flip-flops, amplifiers, inverters, and recirculating delay lines as the detailed circuits for such components are well known to those skilled in the art and the inclusion of such circuit details herein would only tend to mask or obscure the invention. Typical circuit details for the logic symbols shown herein may be seen in Patent No. 2,979,570, issued to Barrie Brightman on April 11, 1961.

AND gates are represented in the drawings by a symbol which has the general shape of a D. The inputs to an AND gate are drawn to the straight line part of the D while the output is drawn from the arcuate portion of the D. All the AND gates illustrated in the drawings are of the type that will provide a negative output potential only when all the inputs are negative. When any one or more of the inputs to an AND gate are positive, the output potential will rise to a more positive potential.

OR gates are similar in appearance to AND gates but are distinguished therefrom by having the input leads extend beyond the straight line portion of the D and to the arcuate portion. All the OR gates illustrated in the drawings are of the type that will provide a negative output potential when one or more of the inputs are negative. When all of the inputs to an OR gate are positive, the output potential will rise to a more positive potential.

Amplifiers are represented by an isosceles triangle with the input at the base and the output at the apex. The amplifiers used in the illustrated embodiment of the invention provide a ground or positive output signal at all times except when a negative input signal is applied to the input of the amplifier. Accordingly, the application of a negative signal to the input of the amplifier causes the amplifier to remove an inhibiting ground potential.

Inverters are similar in appearance to amplifiers but are distinguished therefrom by including a line parallel to and approximately the same length as the base intersecting the sides of the triangle near the apex. The inverters used in the illustrated embodiment of the invention provide a negative output signal at all times except when a negative signal is applied to the input of the amplifier at which time the output changes to a ground or positive signal. Accordingly, the application of a negative signal to the input of the inverter causes the inverter to apply an inhibiting ground potential.

Flip-flop circuits are represented by a rectangle divided into two squares, to represent the two portions of a typical flip-flop circuit. The square representing the reset portion of the flip-flop is shaded while the square representing the set portion of the flip-flop is not shaded. The input signals to reset or set the flip-flops are applied to the shorter sides of the rectangle. The flip-flops used in the illustration are of the type which respond only to positive transients of input signals. When a flip-flop has been reset by a positive transient, a steady ground marking potential is provided on an output lead from the reset side of the flip-flop and a steady state negative marking potential is provided on an output lead from the set side of the flip-flop. When the flip-flop is set, the marking potential on the output leads are reversed.

The delay line registers 110 and 120 include recirculating delay lines registers and provide time slot output pulses on the right. The upper and lower output leads will provide negative and positive output signals, respectively, in any time slot having a signal registered therein. The lower output lead is sometimes referred to as the "not" function, indicating that there is not a registration in the time slot wherein the lower lead remains negaitve. Each delay line register includes means for recirculating a registered pulse until the pulse is extracted and the recirculation is inhibited.

*Detailed description*

Figure 1:
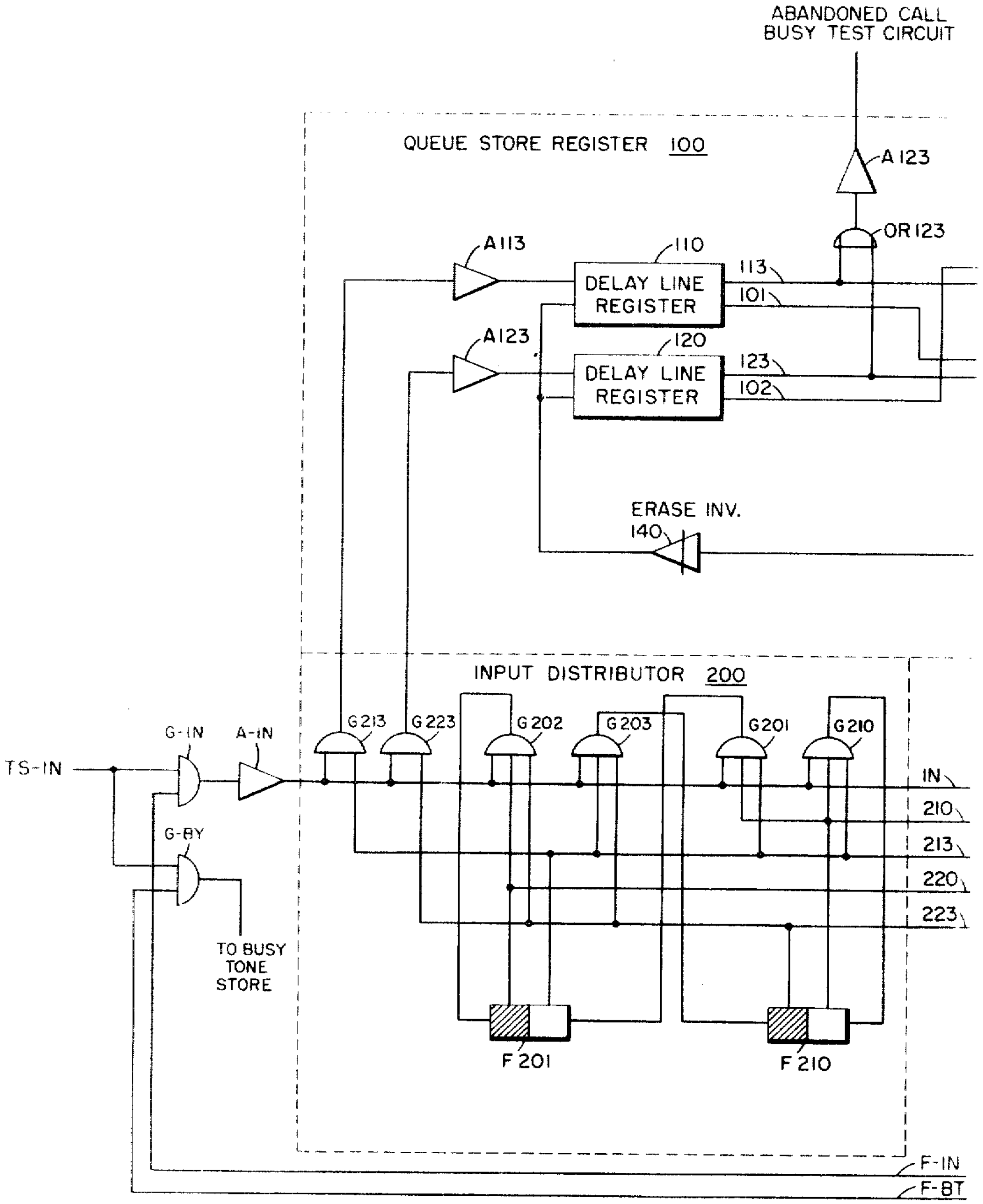
Figure 2:
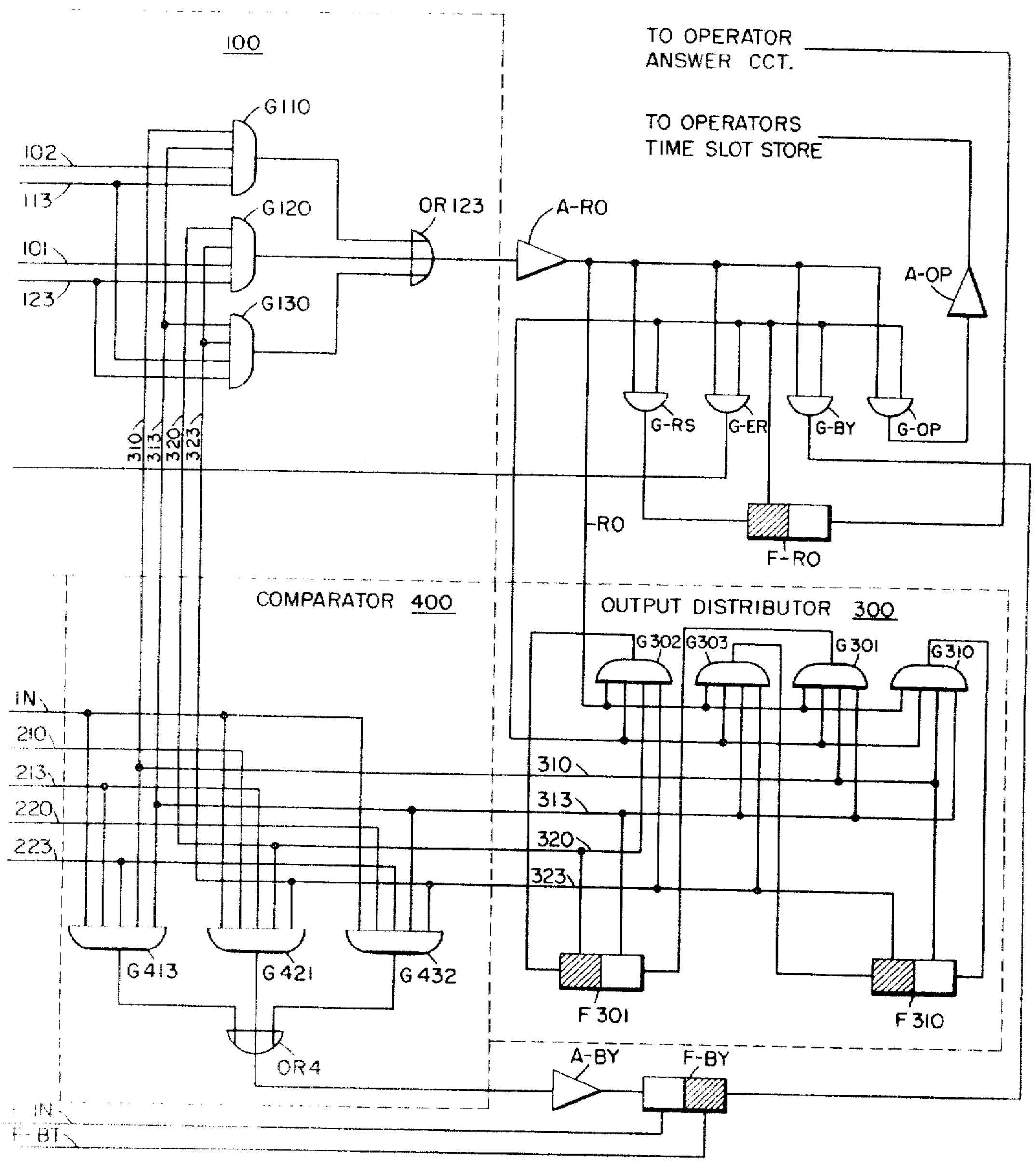

It is believed that the invention can be more fully understood by considering the following detailed description in conjunction with the accompanying drawings. As will be seen from the drawings, the structure includes a queue store register 100, an input distributor 200, an output distributor 300, a comparator 400, and other miscellaneous elements. For convenience in locating and identifying various components and their functions, the logic symbols have been given designations which usually identify their general location, character, and function. For example, the first digit in the numerical designations of logic elements in the queue store register 100 will start with a "1," while the first digit in the numerical designations of logic elements in the input distributor 200 and the output distributor 300 will start with a "2" and "3," respectively. A similar numbering scheme is used for the logic elements included in the comparator 400. In addition, a prefix letter, or letters, may be used to indicate the character of the logic element. For example, AND gates have a prefix "G," OR gates have a prefix "OR," amplifiers a prefix "A," and flip-flops a prefix "F." Logic elements not forming a part of the queue store register 100, the distributors 200 and 300, or the comparator 400, have been given alphabetic designations only wherein the first letter indicates the character of the logic element, as outlined above. As will be seen, the letters following the character, or prefix letter, indicate the principal function of the individual logic elements.

The last two digits of a three-digit numerical designation are indicative of the function of the logic elements if the digits "1," "2" or "3" are used. The use of other digits merely provides uniformity so that all logic elements include three-digit designations.

For convenience in illustrating and describing the invention, it has been chosen to illustrate a system which has a capacity for storing or registering a total of only three waiting calls. It will be obvious to those skilled in the art to which this invention pertains that the principles involved are not so limited and that a system having any desired capacity can be constructed without departing from the teachings disclosed herein. In general, the system will have a capacity equal to one less than two raised to the power of the number of delay line registers provided in the queue store 100. In the illustrated case, there are two registers and, therefore, the capacity is three. Three registers would provide a capacity of seven, while four registers would provide a capacity of fifteen.

As stated, the last two digits of the three-digit designation have been chosen to indicate functional significance. For example, an AND gate having digits "1" and "3" following the first four locating digits will indicate that the gate is intended to pass a pulse that is involved in either the registration or the readout of both the first and third numbers entered into the queue store. Certain leads have, for convenience, been given numerical designations. The numbered leads may provide either inhibiting or enabling potentials to AND gates. The first digit on the leads indicates the main component from which an enabling or inhibiting potential originates, and the second and third digits indicate when the enabling potential is applied to the lead. For example, lead 223 has an enabling potential applied thereto from an element in the input distributor 200 only during the time that the second and third numbers may be registered in the queue store.

Time division multiplex telephone systems employing delay line registers are well known to those skilled in the art and are shown and fully described in such patents as the above-cited Brightman and Schneider patents as well as in the Brightman application, Serial No. 45,342, filed August 26, 1959, entitled, "Delay Line Storage Telephone Switching System," and assigned to the same assignee as the present invention. In typical time division multiplex telephone systems, an available time slot in a repetitive time frame is assigned to a calling line and the called line is coupled to a common highway in the time slot assigned to the calling line. Since such operations do not form a part of this invention, the techniques of assigning time slots or of coupling supervisory tones, completing connections, or responding to dialing pulses, etc., are not shown and described herein as any of the techniques shown in the cited patents may be used.

When a subscriber who desires the assistance of an operator has dialed the appropriate code, a pulse in the time slot, of the repetitive time frame, assigned to the calling subscriber will be applied to the lead designated TS–IN and applied as an input to AND gates G–IN and G–BY. Let it be assumed that there are no numbers registered in the delay lines in the queue store 100 and that all flip-flop circuits are in the condition shown; that is, all the flip-flops are in the reset condition and that, therefore, there is a negative enabling potential on each of the output leads from the unshaded sides of the flip-flops. More specifically, leads 210, 213, 310, 320, and F–IN all have negative or enabling potentials applied thereto. Conversely, leads 213, 223, 313, F–BT, and the output lead from flip-flop F–RO all have positive or inhibiting potentials applied thereto. Accordingly, AND gate G–IN will be enabled to pass the time slot pulse on lead TS–IN and AND gate G–BY will be inhibited from passing the time slot pulse on lead TS–IN.

The enabling potential on lead 210 will provide a first enabling potential to AND gates G201 and G210, and the negative enabling potential on lead 213 will provide a second enabling potential to these same AND gates. In addition, the negative enabling potential on lead 213 will enable AND gate G213. Accordingly, the time slot pulse passed through AND gate G–IN will be amplified by amplifier A–IN and passed through AND gates G213, G201, and G210. The time slot pulse passed through AND gate G213 will be amplified by amplifier A113 and entered into register 110 where it will be recirculated until the recirculation is inhibited when the pulse is read out through OR gate OR123.

It should be noted that the time slot registered in register 110 is the time slot assigned the calling line and not a registration indicative of the calling line number.

The time slot pulse applied to lead TS–IN will also pass through enabled AND gates G201 and G210 to set flip-flops F201 and F210, respectively. The setting of these flip-flops alters the enabling and inhibiting of the gates in the input distributor 200 so that AND gates G223 and G202 are enabled, while AND gates G213, G203, G201, and G210 are inhibited. Therefore, when a second subscriber who desires the operator's assistance dials the appropriate code, a pulse in the time slot assigned the second calling subscriber will be applied to the lead designated TS–IN. It should be understood that the time slot assigned the second calling subscriber bears no particular relationship to the time slot assigned the first calling subscriber. That is, the second subscriber's time slot may occur either earlier or later in the repetitive time frame than the time slot assigned the first calling subscriber. Accordingly, the sequence of the time slots in the registers does not provide any indication of which calling subscriber's time slot was the first to be registered therein. The relative position of each calling subscriber in the queue is indicated by the registration of his time slot in one or more of the registers in a predetermined sequence. For example, in the illustrated case, the first subscriber's time slot will be registered in register 110 only; the second subscriber's time slot will be registered in register 120 only; and the third subscriber's time slot will be registered in both registers 110 and 120. If four registers were employed, the time slots could be registered in one or more of the four registers where the four registers are designated 1, 2, 4, and 8 as follows:

| Sequence Entering Queue | Time Slot Registered in Registers | Binary Equivalent |
|---|---|---|
| 1 | 1 | 0001 |
| 2 | 2 | 0010 |
| 3 | 1, 2 | 0011 |
| 4 | 4 | 0100 |
| 5 | 1, 4 | 0101 |
| 6 | 2, 4 | 0110 |
| 7 | 1, 2, 4 | 0111 |
| 8 | 8 | 1000 |
| 9 | 1, 8 | 1001 |
| 10 | 2, 8 | 1010 |
| 11 | 1, 2, 8 | 1011 |
| 12 | 4, 8 | 1100 |
| 13 | 1, 4, 8 | 1101 |
| 14 | 2, 4, 8 | 1110 |
| 15 | 1, 2, 4, 8 | 1111 |

This system of registration is frequently referred to as binary registration since the registers are used in the same sequence as in binary counting. For convenience in conversion to decimal equivalents of the binary registration, the registers are frequently designated 1, 2, 4, and 8 so that the sum of the designations of the registers having 1's registered therein will add to the decimal equivalent of the registered number. Naturally, other systems of registration may be used although the suggested one is believed to offer maximum convenience.

Returning now to the registration of the time slot assigned to the second subscriber to enter the queue, it will be recalled that the designation will enter the register 120 only and that the registration of the first subscriber's time slot pulse set flip-flops F201 and F210 to enable and inhibit the appropriate AND gates so that the time slot pulse assigned the second subscriber will pass through AND gate G223 to be registered in register 120. Concurrently, the second subscriber's time slot pulse will pass through AND gate G202 to reset the flip-flop F201.

The resetting of flip-flop F201 applies an enabling potential to AND gates G213 and G203 and inhibits AND gate G202. AND gate G223 remains enabled. More specifically, with flip-flop F201 reset and F210 set, leads 213 and 223 will apply an enabling potential, while leads 210 and 220 will apply an inhibiting potential. Accordingly, when a time slot pulse indicative of a third subscriber desiring to enter the queue appears on the lead TS–IN, the pulse will pass through AND gates G213 and G223 to enter registers 110 and 120. In addition, the third time slot pulse will pass through AND gate G203 to reset flip-flop F210.

If it is assumed that none of the subscribers waiting in the queue have been answered by the operator, it will be apparent that the queue store is now filled to its capacity and that, therefore, any other subscribers attempting to enter the queue should be blocked and busy tone should be returned to them. The blocking of the entry of any additional time slot in the registers is accomplished by inhibiting AND gate G–IN; and the application of busy tone to the calling subscriber is accomplished by enabling AND gate G–BY so that the time slot assigned the calling subscriber to be blocked is forwarded to the busy tone store. The inhibiting and enabling of AND gates G–IN and G–BY, respectively, is accomplished by the setting of flip-flop F–BY. When the third subscriber's time slot was passed through AND gate G–IN, the pulse was also applied via the IN lead to AND gate G413, which was enabled by the application of a negative enabling potential to leads 213, 223, 310, and 313 by flip-flops F201, F210, F301, and F310 which were in the reset, set, reset, and reset conditions, respectively. Accordingly, at the same time that the third subscriber's time slot pulse is registered, a pulse is passed through AND gate G413, OR gate OR4, and amplifier A–BY to set flip-flop F–BY. The setting of flip-flop F–BY inhibits and enables AND gates G–IN and G–BY, respectively, as already mentioned.

It should also be noted that the registration of the third time slot in the delay line registers caused flip-flop F210 to be reset, thereby restoring the input distributor 200 to its initial state with flip-flops F201 and F210 both reset. Accordingly, when AND gate G–IN is again enabled, the time slot pulse assigned to the next subscriber seeking entry into the queue store will be registered in the first register 110 only.

It will be seen later that the AND gates in comparator 400 compare the settings of the flip-flops in the input distributor 200 and the output distributor 300 and will pass a signal through OR gate OR4 whenever the registers are found to be filled to their capacity.

*Queue readout*

By means, not shown and which do not form a part of this invention, a signal will be activated at the operator's position whenever there is a time slot signal registered in the queue store. When the operator is able to answer, she will perform an operation which will cause the application of a test time slot pulse to the set lead of flip-flop F–RO and, in response thereto, it will be seen that the time slot pulse which has been registered in the queue store for the longest time will be extracted therefrom. With flip-flop F–RO set, an enabling potential will be applied to all the AND gates in the output distributor 300 and to AND gates G–RS, G–ER, G–BY, and G–OP. If it is assumed that flip-flops F301 and F310 are both in the reset condition, then an enabling potential will be applied to leads 310 and 313. The enabling potentials will enable AND gates G301 and G310 to pass any pulses appearing on the readout lead RO. As previously mentioned, the registers 110 and 120 shift their output leads 113 and 123 from a positive to a negative potential in any time slot registered in the register, while the output leads 101 and 102 shift from negative to positive.

The leads 320 and 323 have positive or inhibiting potential from flip-flops F301 and F310, respectively. Accordingly, AND gates G120 and G130 are inhibited. AND gate G110 will be enabled to pass a signal only when the first register applies a negative potential to lead 113 at the same time that the second register applies a negative potential to lead 102. More specifically, AND gate G110 will pass a time slot pulse only when register 110 has a pulse recorded in a time slot wherein register 120 does not have a pulse recorded in the same time slot position of the repetitive time frame. Accordingly, only the time slot pulse assigned the first calling party can be passed through AND gate G110.

A similar analysis will show that AND gate G120 will only pass signals when there is an enabling potential on leads 320 and 323 and a negative "not" pulse signal is applied to lead 101 at the same time that a negative "yes" pulse signal is applied to lead 123. In a similar manner, AND gate G130 will only pass a signal when there is an enabling potential on leads 313 and 323 and a negative "yes" pulse is on leads 113 and 123 at the same time. Accordingly, as may be seen, the output distributor 300 controls the enabling of AND gates G110, G120, and G130. The sequence of enabling these gates will be such that the time slot pulses indicative of the time slots assigned the various calling subscribers will be extracted from the registers in the same sequence in which they were entered irrespective of the relative sequence of the first, second, and third time slot pulses in the registers 110 and 120 and the time of the setting of flip-flop F–RO. The first time slot pulse gated out of the registers will be gated through gate G110 and the gated output pulse will be in the time slot assigned the first calling subscriber. The output pulse will be passed through OR gate OR123 and be amplified by amplifier A–RO and will pass through enabled AND gates G–RS, G–ER, G–BY, G–OP, G301, and G310. The output pulse through AND gate G–RS is utilized to reset the readout flip-flop F–RO. The output pulse through AND gate G–ER will be utilized to provide an erase signal through erase inverter 140 to inhibit the recirculation of the extracted time slot pulse in the registers 110 and/or 120. The extraction of a pulse from the queue means that the queue is now available to register another time slot if required and, therefore, the pulse passed through AND gate G–BY is utilized to reset flip-flop F–BY in case it had been previously set to inhibit the queuing of any other calls. The pulse passed through AND gate G–OP is applied to the operator's time slot store through amplifier A–OP in order to effect the connection of the operator's circuit to the calling subscriber in the time slot assigned the calling subscriber. Finally, the readout pulse on the RO lead passes through AND gates G301 and G310 to set flip-flops F301 and F310, respectively.

At this time it is possible for a fourth time slot pulse to be registered in the register 110. However, before the fourth time slot can be read out, it is necessary to read out the second and third time slot pulses. That is, the first position in the register does not occupy a first priority position. Each time slot pulse is read out in the same sequence in which it was recorded.

The setting of flip-flops F301 and F310 causes an enabling potential to be applied to leads 320 and 323 and applies an inhibiting potential to leads 310 and 313. Under these conditions, it will be seen that when the operator sets flip-flop F–RO to initiate the extraction of the second time slot pulse from the queue store, that a pulse will be passed through AND gate G120 and then through AND gates G–RS, G–ER, G–BY, and G–OP with the same results as set forth above. In addition, the pulse will be passed through AND gate G302 to reset flip-flop F301.

The setting of flip-flop F301 causes an enabling potential to be applied to lead 313, while the enabling potential on lead 323 remains. Leads 310 and 320 will have inhibiting potentials applied thereto. Under these conditions, it will be seen that when the operator sets flip-flop F–RO to initiate the extraction of the third time slot pulse in the queue store, that a pulse will be passed through AND gate G130 and thence through AND gates G–RS, G–ER, G–BY, and G–OP with the same results as set forth above. In addition, a pulse will be passed through AND gate G303 to reset flip-flop F310.

The setting of flip-flop F310 restores the output distributor to its original condition so that the next time slot pulse to be extracted from the queue store will be the fourth time slot pulse which may be registered in the register 110 only in the same manner that the first time slot pulse was recorded.

As was seen previously, a pulse will be passed through gate G413 when the output distributor 300 is set to read out the first pulse and the input distributor 200 has just filled the registers by admitting the third time slot pulse. In a similar manner, a pulse will be passed through AND gate G421 when the output distributor 300 is set to read out the second time slot pulse and the input distributor 200 has just filled the registers by admitting the fourth time slot pulse (which, of course, is entered in the same manner as the first time slot pulse). In a similar manner, a pulse will be passed through AND gate G432 when the output distributor 300 is set to read out the third time slot pulse and the input distributor 200 has just filled the registers by admitting the fifth time slot pulse (which, of course, is entered in the same manner as the second time slot pulse).

As previously mentioned, a subscriber who has dialed the appropriate code to obtain the assistance of an operator will hear either ringback tone or a recorded message. In the event that a calling subscriber does not choose to wait for the operator, the calling subscriber may disconnect or abandon the call. Normally, as may be seen by referring to the cited patents, a disconnect by a calling subscriber causes any registered time slot signals assigned to that calling subscriber to be erased to allow that time slot to be reassigned to any other subscriber. However, since the proper advancing of the output distributor 300 is dependent upon the extraction of time slot pulses from the queue store 100, it is necessary to leave the time slot in the registers 110 and/or 120 even though the calling subscriber has abandoned the call. Further, since the time slot remains in the queue store, that time slot must not be reassigned to any other subscriber until the time slot has been extracted from the queue store. Accordingly, leads 113 and 123 are connected to OR gate OR123 and any time slot pulse appearing on either of these leads provides a signal through amplifier A123 to the abandoned call busy test circuit whose function is to prevent the allotting of these time slots to any calling subscriber until the time slot has been extracted from the queue store.

Although this invention has been described as applied to a system for queuing calling telephone subscribers waiting for operator assistance, it is apparent that the same principles may be used for other telephone or nontelephone applications. For example, subscribers waiting for recall or flash service could be queued, or the principles may be used to assure sequential handling of any type of service in a time division multiplex system. If desired, the queuing may be done on a marked line or priority basis so that important or emergency calls are routed directly to the operator without waiting in a queue. Therefore, although there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a time division multiplex queue store, an input distributor means and an output distributor means each having $n$ distinct sequential states, recirculating delay line register means, a source of input signals each representing a distinct time slot in a repetitive time frame, said input distributor means responsive to a signal in any one random time slot from said source for registering a pulse indicative of said one time slot in said register means in the time slot which it represents, said input distributor means responsive to a subsequent signal in any other random time slot from said source for registering a pulse indicative of said other time slot in said register means in the time slot which it represents, comparison means responsive to the registration of signals indicative of $n$ time slots in said register means for inhibiting the registration of signals indicative of any additional time slots in said register means, a source of readout signals, said output distributor means responsive to a signal from said readout source for extracting the signal indicative of said one time slot from said register means, said output distributor means responsive to a subsequent signal from said readout source for extracting the signal indicative of said other time slot from said register means, and said comparison means responsive to the extraction of a signal indicative of a time slot signal from said register means for enabling the registration of a signal indicative of an additional time slot in said register means, said input signals received by said input distributor means representing random time slots in said repetitive time frame.

2. The combination as set forth in claim 1 wherein the signals extracted from said register means are extracted in the same sequence in which they were stored in said register means.

3. The combination as set forth in claim 2 wherein said input distributor means is shifted from one to another of its $n$ states in response to the registration of each signal from said source of input time slot signals.

4. The combination as set forth in claim 3 wherein said input distributor means is shifted from its $n$th state to its first state in response to the registration of the $n$th signal from said source of input time slot signals.

5. The combination as set forth in claim 4 wherein said output distributor means is shifted from one to another of its $n$ states in response to the extraction of each signal from said register means.

6. The combination as set forth in clam 5 wherein said output distributor means is shifted from its $n$th state to its first state in response to the extraction of the $n$th signal from said register means.

7. A plurality of recirculating delay line registers, input distributor means coupled to said registers, a source of time slot pulses each representing a distinct time slot in a repetitive time frame, said input distributor means responsive to a first time solt pulse from said source for registering a signal indicative of said first time slot pulse in a first predetermined combination of said registers in the time slot therein which it represents, said input distributor means responsive to a second time slot pulse from said source for registering a signal indicative of said second time slot pulse in a second predetermined combination of said registers in the time slot therein which it represents, an output distributor means coupled to said registers, a source of readout pulses, said output distributor means responsive to a first pulse from said source of readout pulses for extracting said signal indicative of said first time slot from said first predetermined combination of registers, and said output distributor means responsive to a second pulse from said source of readout pulses for extracting said signal indicative of said second time slot from said second predetermined combination of registers.

8. The combination as set forth in claim 7 wherein said registers comprise $n$ predetermined combinations, and wherein said input distributor means is responsive to each of $n$ successive time slot pulses from said source of time slot pulses for registering a signal indicative thereof in a different combination of said $n$ predetermined combinations in a sequential manner.

9. The combination as set forth in claim 8 wherein said output distributor means is responsive to successive pulses from said source of readout pules for extracting the signals registered in said combination of registers in the same sequence in which they were registered.

10. The combination as set forth in claim 9 and including comparison means connected to said input and output distributor means for preventing the registration of any signals in said register means when signals are already registered in each of said $n$ predetermined combinations.

11. The combination as set forth in claim 10 wherein said comparison means is responsive to the extraction of signals from one of the predetermined combinations of said registers for permitting the registration of signals indicative of a time slot signal from said source of time slot signals in the one of said combinations of registers from which an indicative signal was extracted.

12. In a time division multiplex queue store for storing signals each representing a distinct time slot in a repetitive time frame in the order in which they are received and for making said signals available upon command in the same order, plural recirculating delay line register means for storing said signals in the time slot of a repetitive time frame to which they individually correspond, input distributor means having $n$ distinct sequential states connected to said plural register means for distributing said signals among said plural register means in a binary sequence, output distributor means having $n$ distinct sequential states connected to said plural register means for extracting from said register means upon each command applied thereto a stored signal in the binary sequence in which said signals are received.

13. The combination as set forth in claim 12 further comprising comparison means connected between said input distributor means and said output distributor means responsive to the storage of signals in said register means indicative of $n$ time slots for inhibiting the registration of additional signals in said register means.

14. The combination as set forth in claim 13 wherein said input distributor means includes first gating means for advancing the state thereof in response to receipt of each time slot signal and second gating means for applying a time slot signal to a different binary combination of said plural register means for each of the $n$ states of said first gating means.

15. The combination as set forth in claim 14 wherein said output distributor means includes third gating means for advancing the state thereof in response to each command applied thereto, and fourth gating means associated with said register means for extracting a time slot signal common to a different binary combination of register means for each of the $n$ states of said third gating means.

16. The combination set forth in claim 15 wherein said input distributor means and said output distributor means are separately controlled so as to advance in state independently of one another.

References Cited by the Examiner

UNITED STATES PATENTS

| | | | |
|---|---|---|---|
| 2,799,845 | 7/1957 | Dietrich | 340—174 |
| 3,029,414 | 4/1962 | Schrimpf | 340—172.5 |
| 3,107,344 | 10/1963 | Baker | 340—173 |
| 3,153,775 | 10/1964 | Marsh | 340—172.5 |
| 3,166,734 | 1/1965 | Helfrich | 340—147 |
| 3,202,969 | 8/1965 | Dunwell | 340—172.5 |
| 3,221,307 | 11/1965 | Manning | 340—172.5 |
| 3,238,298 | 3/1966 | Willis | 178—50 |
| 3,246,305 | 4/1966 | Arneth | 340—172.5 |

ROBERT C. BAILEY, *Primary Examiner.*

I. S. KAVRUKOV, *Assistant Examiner.*